March 29, 1960　　　　G. W. LOHR　　　　2,930,559
BASE AND ADJUSTABLE BRACKET FOR CHRISTMAS TREES
Filed July 11, 1958　　　　　　　　　　　　2 Sheets-Sheet 1
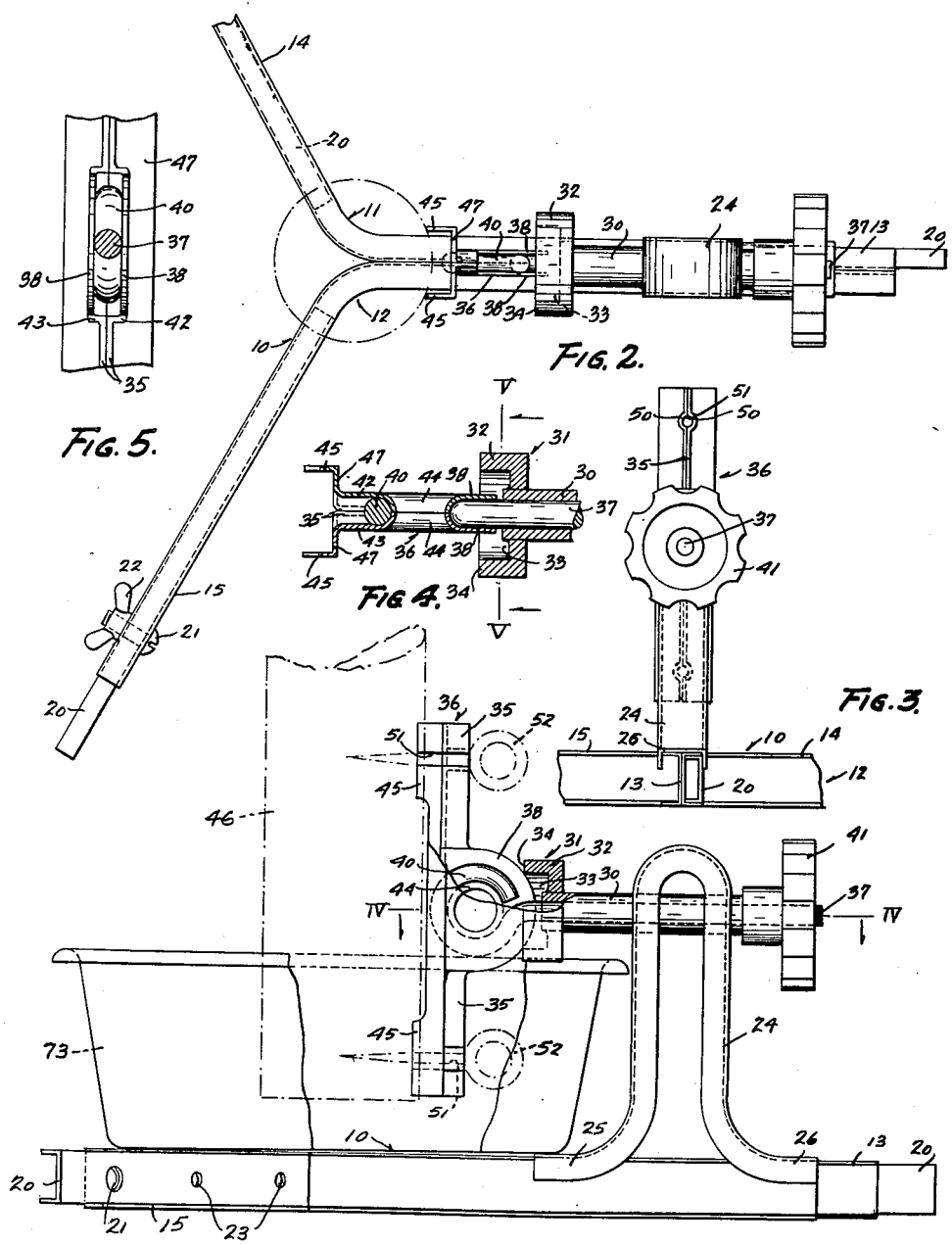
INVENTOR.
GEORGE W. LOHR
BY
Bean, Brooks, Buckley & Bean
ATTORNEYS March 29, 1960  G. W. LOHR  2,930,559
BASE AND ADJUSTABLE BRACKET FOR CHRISTMAS TREES
Filed July 11, 1958  2 Sheets-Sheet 2
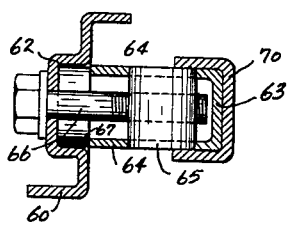
FIG. 9.
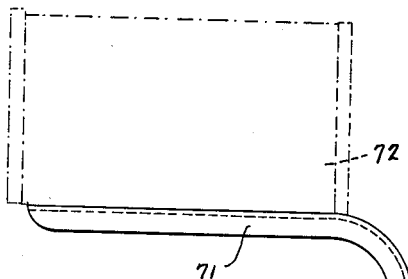
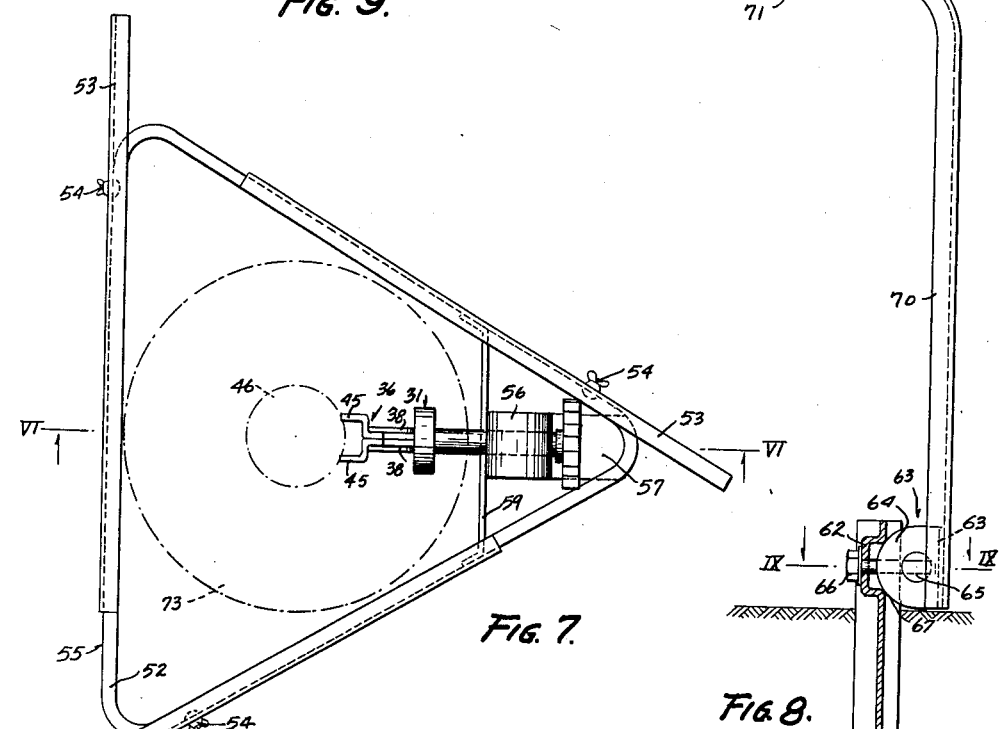
FIG. 7.
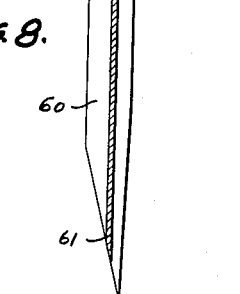
FIG. 8.
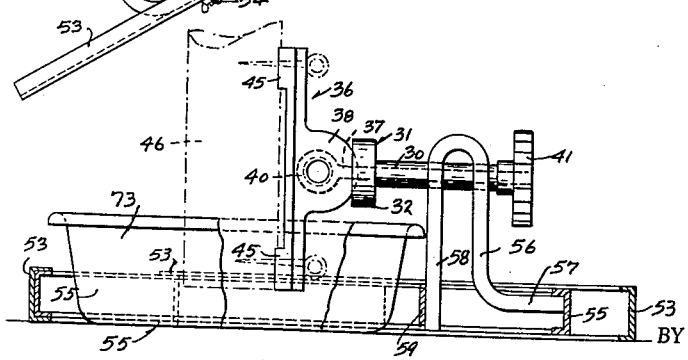
FIG. 6.
INVENTOR.
GEORGE W. LOHR
BY
Bean, Brooks, Buckley & Bean.
ATTORNEYS

United States Patent Office 2,930,559
Patented Mar. 29, 1960

2,930,559

BASE AND ADJUSTABLE BRACKET FOR CHRISTMAS TREES

George W. Lohr, East Aurora, N.Y.

Application July 11, 1958, Serial No. 747,908

9 Claims. (Cl. 248—44)

My invention relates in general to vertical support devices and in particular to a device for holding a vertically extending member, such a a Christmas tree or mail box support.

It is well known that Christmas trees are difficult to mount, owing to the fact that many of them are crooked or curved at the base of the trunk and cannot be readily adjusted in the present day holder or support so as to have the trunk of the tree in a vertical line.

It is a principal object of my invention to provide a holder or support by which the trunk of the tree may be clamped and then readily adjusted to the desired vertical position at will.

Another object is to provide a support which may be readily adjusted at any angle to a vertical plane.

A further object is to provide a tree holder which will accommodate trees of various sizes.

Another object is to provide an adjustable support in which all adjustments are locked by means of one clamp.

A further object is to provide a support the legs of which are adjustable so that the proper spread of the base may be had, thereby preventing swaying of the tree.

Moreover, my device permits the use of a separate water pan into which the end of the tree trunk may be submerged and which may be removed from the support and the tree trunk without requiring the removal of the water.

These and other objects are accomplished by the device shown in the accompanying drawings, of which:

Fig. 1 is a side elevation of one form of my device;

Fig. 2 is a plan view thereof, portions being broken away;

Fig. 3 is an end elevation of the form of device shown in Figs. 1 and 2;

Fig. 4 is a fragmentary sectional plan view taken on line IV—IV of Fig. 1;

Fig. 5 is a fragmentary sectional view taken on line V—V of Fig. 4;

Fig. 6 is a side elevation of a modified form of the device;

Fig. 7 is still another modified form of the device and is a plan view thereof;

Fig. 8 is a side elevation of the form of device shown in Fig. 7; and

Fig. 9 is an enlarged sectional view taken on line IX—IX of Fig. 8.

Referring now to the form of the invention shown in Figs. 1 to 5, inclusive, 10 represents the base of the device which comprises members 11 and 12 preferably of channel iron. These members are arranged with their web portions opposite each other, as shown in Figs. 2 and 3 and thereby form one leg 13 of the structure. The other ends of the members 11 and 12 are bent outwardly at an angle as shown in Fig. 2 and form legs 14 and 15. Slidably telescoped within the legs 13, 14 and 15 are leg extensions 20 which are held in place within the respective legs by means of a bolt 21 secured in place by means of a wing nut 22. The leg members and leg extensions are provided with apertures 23 at various points throughout their length, whereby the extensions may be adjusted and the size and spread of the base altered to suit the size of the tree.

Mounted near the end of the leg 13 is a standard 24 which is of inverted U-shape form and which has its lower ends 25 and 26 extending outwardly and secured to the top of the leg 13, preferably by welding or the like. Passing through the upper portion of the standard 24 is a horizontally arranged clamp sleeve 30 which is secured to the standard by any suitable means. This sleeve carries at its inner end a stationary clamp member 31 comprising a cup 32 having a recess 33 formed in its front face, thereby providing a clamp ring 34 which is brought to bear against the clamp flanges 38 of the clamp bracket 36, to be hereinafter described. A clamp screw 37 is passed through an aperture formed in the clamp sleeve 30, and this screw is formed at its inner end with eyelet 40. Mounted upon the outer end of the screw is a clamp knob 41 whereby the device may be clamped in adjusted position.

The clamp bracket 36 is formed preferably of two duplicate parts 42 and 43 which are preferably made of sheet iron. These members are disposed in reverse positions and are fastened together by welding or the like. The central portions of the bracket flanges 35 are spread or expanded, thereby forming spaced clamp flanges 38. The central portion of the clamp flanges are turned inwardly in opposite directions, thereby forming the annular pivot flanges 44 for the pivotal connection of screw eyelet 40. The outer edge surfaces of the clamp flanges 38 are substantially semi-circular in contour and are concentric with the pivot flanges 44, whereby the clamp bracket is movable in a plane parallel to the axis of the screw 37. Each of the bracket flanges has a laterally extending portion 47 along the outer edges of which are formed lugs 45. These lugs are provided at each end of the bracket and are spaced apart longitudinally and laterally so as to provide spaced gripping points on the tree trunk 46 when engaged therewith.

Each of the bracket flanges is formed near its end with semi-cylindrically shaped expanded portions 50, whereby holes 51 are provided for the passage of suitable tree fastening means 52, shown in dot and dash lines in Fig. 1. These fastening means are passed through the holes 50 and into the trunk of the tree 46 shown in dot and dash lines, whereby the tree is firmly held against the clamp lugs 45. It will be obvious that since the clamp bracket 36 is spaced from the top of the base, and since it is movable about its pivot, the water pan 73 may be removed without removing the water therefrom.

Referring now to the modified form of invention shown in Figs. 6 and 7, the base 55 is in the form of an enclosed ring 52 of triangular shape, and, like that of the base of the other form of invention, is preferably made of channel iron with the flanges extending inwardly and the web thereof disposed at the outside. A leg extension 53 is disposed over each side of the base and is secured in adjusted position by means of bolts 54 which pass through suitable apertures (not shown) formed in each web and adjacent extension. The standard 56 of inverted U-shape and the leg 57 thereof is arranged in a horizontal plane and is extended to the curved portion of the base where two of the sides join where it is secured. The other leg 58 of the standard is extended downwardly and is secured to a cross member 59 extending between adjacent opposite sides of the base.

A water pan 73 may also be used in this form of the device as shown in dot and dash lines on the drawing.

Referring now to the form of invention shown in Figs.

8 and 9 which shows the device as applied to a mailbox support, a spike 60 preferably of Z-shaped cross section is pointed at 61 and is driven into the ground a sufficient distance to properly support the mailbox. The web of the Z-shaped spike is provided with an offset portion 62 which is preferably circular in form thereby providing an annular ring 67 for performing substantially the same functions as the stationary cup member 31 of the other forms of the invention. Arranged opposite the offset portion of the Z-shaped member is the adjustable clamp member of this form of the invention, comprising a substantially U-shaped member 63 formed with a pair of substantially parallel clamp flanges 64 which are spaced apart and which support a nut member 65. The nut member is mounted in a suitable aperture formed in each of the flanges 64 and it is provided with a diametrically arranged tapped hole through which a clamp bolt 66 is passed. The outer edge surfaces of the clamp flanges 64 are semi-circular in contour and the clamp bolt serves to draw the arcuate surfaces of these flanges into clamping engagement with the ring 67 of the offset portion 62 of the spike. An upright 70 is fixed at its lower end to the member 63 and is therefore adjustably mounted with respect to spike 60. The upper end of the upright 70 is preferably provided with a lateral portion 71 which serves to support a mailbox 72 (shown in dot and dash lines) or any other desired object.

Referring to the forms of invention shown in Figs. 1–6 inclusive, the tree 46 when being mounted is first placed against the clamp lugs 45 of the bracket 36 and it is secured in place by suitable fastening means 52. These fastening means which may be screw eyes or wood screws are inserted into the trunk and securely hold it against the clamping bracket. When the tree is thus secured in place, the clamp nut 41 is loosened and the tree may then be swung in universal manner to the position where it will best conform to a substantially vertical line. Movement in a plane parallel to the plane passing through the axis of the screw 37 is accomplished by rotating the clamp bracket upon its pivot flanges 44 and about the eyelet 40 until position of the tree has been properly adjusted. Movement or adjustment in a plane at right angles to the axis of the screw is accomplished by rotation of the screw within the sleeve 30. When the tree has been universally adjusted to the desired position in both planes, the clamp knob 41 is tightened, which causes the clamp ring 34 of the clamp cup 31 to be drawn tightly against the arcuate surfaces of the clamp flanges 38, thereby locking the bracket and the tree in adjusted position. It will be obvious that all adjustments of the bracket are locked with but one clamping screw. Owing to the fact that bracket with the tree may be tilted, it is clear that the water pan 73 may be removed without removing the water therefrom.

When my invention is applied to the mailbox support, the upright 70 is adjusted backwardly or forwardly on the nut member 65 and the engaged circular surfaces, the clamp flange 64 with the annular ring 67 of the offset 62 of the spike, and it is turned to the right or the left about the axis of the screw 66, until it occupies a true vertical position, whereupon all parts of the device are clamped by means of the single screw 66.

Obviously, some modification of the devices shown and described may be made without departing from the spirit of my invention, and I do not, therefore, wish to be limited to the details herein shown and described.

Having thus described my invention, what I claim is:

1. A support device, comprising a base member, a stationary clamp member carried by said base member, a clamp bracket having flanges of semi-circular edge contour in universally adjustable engagement with said stationary clamp member, said bracket being adapted to have a vertical object secured thereto, and screw means carried by said bracket and said base member for clamping said bracket to said stationary member.

2. A support device, comprising a base member, a vertical standard carried by said base member, a stationary clamp member carried by said standard, a clamp bracket in universally adjustable relation with said stationary member, said bracket having flanges of semi-circular contour in clamping engagement with said stationary member, said bracket being adapted to have a vertical object secured thereto, and screw means carried by said bracket and said standard for clamping said bracket to said stationary member.

3. A support device, comprising a base member, a stationary clamp member carried by said base member, an annular clamp ring carried by said clamp member, a clamp bracket associated with said clamp ring and adapted to have a vertical object secured thereto, said bracket having clamp flanges formed with edge surfaces of semi-cylindrical contour in universal engagement with said clamp ring, and a clamp screw carried by said base member and pivotally attached to said bracket for locking said bracket to said clamp ring.

4. A support device, comprising a base member, a vertical standard carried by said base member, a clamp sleeve carried by said standard, a stationary clamp member carried by said sleeve, an annular clamp ring carried by said clamp member, a clamp bracket pivotally carried by said standard and universally adjustable on said ring, and a clamp screw carried by said base member and pivotally attached to said bracket for locking said bracket to said clamp ring.

5. A support device, comprising a base member, a stationary clamp member carried by said base member, a clamp bracket adjustably associated with said stationary member, said bracket being adapted to have a vertical object secured thereto, said bracket comprising two oppositely arranged duplicate parts, a spaced clamp flange carried by each of said bracket parts and having edge surfaces of semi-cylindrical contour, an annular clamp ring carried by said stationary member for universal adjustment with said clamping flanges, clamp screw means carried by said stationary member and formed at its inner end with an eyelet, and inwardly projecting pivot flanges carried by said clamping flanges for pivotally receiving said screw eyelet.

6. A support device, comprising a base member, a stationary clamp member carried by said base member, a clamp bracket adjustably associated with said stationary member, said bracket being adapted to have a vertical object secured thereto, said bracket comprising two oppositely arranged duplicate parts, a spaced clamp flange carried by each of said bracket parts and having edge surfaces of semi-cylindrical contour, an annular clamp ring carried by said stationary member for universal adjustment with said clamping flanges, clamp screw means carried by said stationary member and formed at its inner end with an eyelet, inwardly projecting pivot flanges carried by said clamping flanges and pivotally receiving said screw eyelet, and said bracket flanges being spaced apart to form apertures for the passage of means for fastening said vertical member to said bracket.

7. A device for supporting a hewn tree, comprising a base member, a stationary clamp member carried by said base member, a clamp bracket in universally adjustable relation with said stationary member, said bracket having flanges of semi-circular edge contour in clamping engagement with said stationary member, means for fastening the tree to said bracket, and screw means carried by said bracket and said base for clamping said bracket to said stationary member.

8. A support device, comprising a base member, a stationary clamp member carried by said base member, a clamp bracket adjustably associated with said stationary member, said bracket being adapted to have a vertical object secured thereto, said bracket comprising two oppositely arranged duplicate parts, a spaced clamp flange carried by each of said bracket parts and having edge surfaces of semi-cylindrical contour, an annular clamp ring carried by said stationary member in universal adjustment with said clamping flanges, and clamp screw means carried by said base member and pivotally attached to said bracket for locking said bracket to said base member.

9. A hewn tree support device comprising, a base member, a standard extending rigidly upwardly from said base, a tree trunk attachment bracket mounted upon said standard by means of a universal pivot connection device and adapted to extend alongside the trunk of a tree to be supported, means for clamping a tree trunk to said bracket, and means for locking said pivot connection device in various positions of adjustment.

References Cited in the file of this patent

UNITED STATES PATENTS

| | | |
|---|---|---|
| 416,755 | Schoenike | Dec. 10, 1889 |
| 774,497 | Rompel | Nov. 8, 1904 |

FOREIGN PATENTS

| | | |
|---|---|---|
| 814,413 | Germany | Sept. 20, 1951 |